US009353013B2

(12) United States Patent
Hinoki et al.

(10) Patent No.: US 9,353,013 B2
(45) Date of Patent: May 31, 2016

(54) SIC CERAMIC MATERIAL, SIC CERAMIC STRUCTURE, AND THEIR FABRICATION METHODS (75) Inventors: Tatsuya Hinoki, Uji (JP); Yi-Hyun Park, Uji (JP)

(73) Assignee: KYOTO UNIVERSITY, Kyoto (JP)

( * ) Notice: Subject to any disclaimer, the term of this patent is extended or adjusted under 35 U.S.C. 154(b) by 22 days.

(21) Appl. No.: 13/884,636

(22) PCT Filed: Nov. 10, 2011

(86) PCT No.: PCT/JP2011/076004
§ 371 (c)(1),
(2), (4) Date: Jul. 9, 2013

(87) PCT Pub. No.: WO2012/063923
PCT Pub. Date: May 18, 2012

(65) Prior Publication Data
US 2013/0288880 A1    Oct. 31, 2013

(30) Foreign Application Priority Data
Nov. 11, 2010    (JP) ................................. 2010-252729

(51) Int. Cl.
*C04B 35/575* (2006.01)
*C04B 35/565* (2006.01)
(Continued)

(52) U.S. Cl.
CPC ............... *C04B 35/575* (2013.01); *B32B 18/00* (2013.01); *C04B 35/565* (2013.01);
(Continued)

(58) Field of Classification Search
CPC ............... C04B 14/324; C04B 35/565; C04B 2235/5244

USPC .......................................................... 264/682
See application file for complete search history.

(56) References Cited

U.S. PATENT DOCUMENTS 5,376,599 A * 12/1994 Oshima et al. .................. 501/90
6,024,898 A    2/2000 Steibel et al.
(Continued)

FOREIGN PATENT DOCUMENTS

EP    0 891 956 A2    1/1999
EP    1 676 824 A1    7/2006
(Continued)

OTHER PUBLICATIONS

Park et al., "Development of multi-functional NITE-porous SiC for ceramic insulators," *Journal of Nuclear Materials*, (2009), pp. 1014-1017.

(Continued)

*Primary Examiner* — Angela Ortiz
*Assistant Examiner* — Russell Kemmerle, III
(74) *Attorney, Agent, or Firm* — Oliff PLC (57) ABSTRACT A SiC ceramic material includes a bundle of SiC continuous fibers in a porous SiC ceramic matrix, has thermal insulation properties, a high level of strength and a high degree of toughness. A SiC ceramic structure is made of the SiC ceramic material. It is produced by preparing a pressure-sintered compact using a slurry prepared by mixing SiC powder and carbon powder in a liquid and by gasifying and releasing the carbon powder. The SiC ceramic structure can be produced by heating a reaction preparation containing a bundle of SiC continuous fibers and Si powder to a temperature equal to or higher than the melting point of silicon causing a reaction of the carbon component and Si powder and thereby obtaining a reaction-sintered compact, and by gasifying and releasing the carbon component from the reaction-sintered compact. The SiC ceramic can be produced by a chemical vapor deposition method.

16 Claims, 4 Drawing Sheets

(51) Int. Cl.
*B32B 18/00* (2006.01)
*C04B 35/573* (2006.01)
*C04B 35/645* (2006.01)
*C04B 35/80* (2006.01)
*C04B 38/00* (2006.01)
*C04B 38/06* (2006.01)
*G21B 1/13* (2006.01)
*C04B 111/28* (2006.01)
*G21C 7/10* (2006.01)
*G21C 15/00* (2006.01)
*G21C 17/017* (2006.01)
*H05H 1/46* (2006.01)

(52) U.S. Cl.
CPC ............ *C04B 35/573* (2013.01); *C04B 35/645* (2013.01); *C04B 35/806* (2013.01); *C04B 38/0032* (2013.01); *C04B 38/068* (2013.01); *G21B 1/13* (2013.01); *C04B 2111/28* (2013.01); *C04B 2235/3217* (2013.01); *C04B 2235/3225* (2013.01); *C04B 2235/383* (2013.01); *C04B 2235/3826* (2013.01); *C04B 2235/3834* (2013.01); *C04B 2235/422* (2013.01); *C04B 2235/5244* (2013.01); *C04B 2235/5264* (2013.01); *C04B 2235/614* (2013.01); *C04B 2235/616* (2013.01); *C04B 2235/662* (2013.01); *C04B 2235/77* (2013.01); *C04B 2235/96* (2013.01); *C04B 2235/9607* (2013.01); *C04B 2237/365* (2013.01); *C04B 2237/38* (2013.01); *G21C 7/10* (2013.01); *G21C 15/00* (2013.01); *G21C 17/017* (2013.01); *H05H 2001/4695* (2013.01); *Y02E 30/128* (2013.01)

(56) References Cited

U.S. PATENT DOCUMENTS

| | | | | |
|---|---|---|---|---|
| 6,040,008 | A | * | 3/2000 | Sacks ............................ 427/226 |
| 6,246,740 | B1 | | 6/2001 | Maruyama et al. |
| 2009/0242100 | A1 | * | 10/2009 | Saijo .......................... 156/89.22 |
| 2013/0029127 | A1 | * | 1/2013 | Suzuki et al. ................. 428/221 |

FOREIGN PATENT DOCUMENTS

| | | |
|---|---|---|
| FR | 2 769 621 A1 | 4/1999 |
| JP | A-11-116337 | 4/1999 |
| JP | A-11-130558 | 5/1999 |
| JP | A-2001-58880 | 3/2001 |
| JP | A-2001-158673 | 6/2001 |
| JP | A-2008-222500 | 9/2008 |

OTHER PUBLICATIONS

Feb. 14, 2012 International Search Report issued in International Patent Application No. PCT/JP2011/076004.

May 14, 2013 International Preliminary Report on Patentability issued in International Application No. PCT/JP2011/076004 (with translation).

Extended European Search Report issued in European Patent Application No. 11839148.1 dated Jul. 11, 2014.

Office Action issued in Korean Patent Application No. 10-2013-7014875 mailed Jun. 25, 2014 (with partial translation).

Sep. 29, 2015 Office Action issued in Japanese Application No. 2012-542982.

Mar. 29, 2016 Office Action issued in Japanese Patent Application No. 2012-542982.

* cited by examiner

SIC CERAMIC MATERIAL, SIC CERAMIC STRUCTURE, AND THEIR FABRICATION METHODS

TECHNICAL FIELD

The present invention relates to a material using a SiC ceramic, a structure made of the material, and a method for producing the structure.

BACKGROUND ART

Porous SiC ceramics are a type of materials made of silicon carbide (SiC) which have an infinite number of micro pores. They have excellent thermal and electrical insulation properties as well as good heat resistance, and therefore, are expected to be used for functional structures in nuclear energy systems, sustainable-energy systems and other similar systems.

Conventional porous SiC ceramics are produced by forming a material into a certain shape and sintering it by an appropriate sintering method, such as the pressureless sintering, reaction sintering or macromolecule sintering. However, porous SiC ceramics produced by these conventional methods have low strengths due to the weak bonding force between SiC molecules. This means that the product easily cracks by a shock or the like, so that it cannot be used as a structural material.

Given this problem, attempts have been made to provide porous SiC ceramics with an increased strength.

For example, Non-Patent Document 1 discloses a porous SiC ceramic produced by sintering a mixture of SiC powder and carbon powder under high pressure and high temperature, and subjecting the sintered product to a decarburization process. In the porous SiC ceramic according to this document, the portions other than the pores are sintered with a strong bonding force, making the product remarkably higher in strength than conventional ones.

BACKGROUND ART DOCUMENT

Non-Patent Document

Non-Patent Document 1: Yi-Hyun PARK, Tatsuya HINOKI, Akira KOHYAMA, "Development of Multi-Functional NITE-Porous SiC for Ceramic Insulators," Journal of Nuclear Materials, 386-388, pp. 1014-1017, 2009

SUMMARY OF THE INVENTION

Problem to be Solved by the Invention

Although the porous SiC ceramic according to Non-Patent Document 1 has high strength, its toughness is extremely low. That is to say, similar to glass products, even a slight, partial crack leads to a sudden rupture of the entire product. Accordingly, using this ceramic as a structural material is still difficult.

Accordingly, the problem to be solved by the present invention is to provide a SiC ceramic material having not only high thermal insulation properties, high heat resistance and high strength but also a high degree of toughness, and to provide a SiC ceramic structure as well as a method for producing the structure.

Means for Solving the Problems

A SiC ceramic material according to the present invention aimed at solving the aforementioned problem is characterized in that porous SiC ceramics are reinforced with continuous SiC fibers.

The porous SiC ceramic matrix used in the SiC ceramic material according to the present invention should preferably have a porosity within a range from 15 to 80%. A porous SiC ceramic matrix with the porosity lower than 15% cannot provide adequate thermal insulation properties. By contrast, if the porosity is higher than 80%, it is difficult to ensure adequate strength and toughness. In the case of using the SiC ceramic material according to the present invention in the fields of nuclear energy, aerospace or other areas in which high thermal insulation properties, a high level of thermal resistance and a high degree of toughness are particularly required, the porosity of the porous SiC ceramic matrix should preferably be within a range from 25 to 60%.

In the SiC ceramic material according to the present invention, a SiC continuous fiber is any type of SiC fiber exclusive of SiC chopped fibers, which is produced by chopping fibers. There are many types of SiC continuous fibers with different thicknesses. For the present invention, a fiber having a diameter within a range from about 5 $\mu$m to about 200 $\mu$m is preferable.

A SiC ceramic structure according to the present invention aimed at solving the aforementioned problem is characterized in that it is a structure with various shapes made of the previously described SiC ceramic material. The SiC ceramic structure according to the present invention may include a non-fiber-reinforced portion made of the aforementioned porous SiC ceramic matrix containing no SiC fiber, in addition to the fiber-reinforced portion made of a porous ceramic matrix containing a bundle of SiC continuous fibers, The SiC ceramic structure according to the present invention can be produced by a method including:

a slurry preparation step, in which a slurry is prepared by mixing SiC powder and carbon powder in a liquid;

a pressure sintering step, in which a bundle of SiC fibers and the slurry are put in a mold and sintered, while being pressurized, to obtain a pressure-sintered compact; and a decarburization step, in which the pressure-sintered compact is heated to gasify and release the carbon powder contained in the pressure-sintered compact.

The SiC ceramic structure can be shaped like a rod shape or plate. A rod-shaped structure can be obtained by creating a pressure-sintered compact from a rod-shaped bundle of SiC fibers and decarburizing this compact. A plate-shaped structure can be obtained by creating a pressure-sintered compact from a sheet made of a bundle of SiC fibers and decarburizing this compact. In any of these cases, the number of bundles of the SiC fibers included in the porous SiC ceramic matrix may be any number equal to or greater than one. By combining these shapes, it is possible to produce SiC ceramic structures not only in the rod or plate shape but also in various shapes.

The SiC ceramic structure according to the present invention can also be produced by a method including:

a slurry preparation step, in which a slurry is prepared by mixing SiC powder and carbon powder in a liquid;

a prepreg sheet preparation step, in which a prepreg sheet is prepared by infiltrating the slurry into a sheet made of a bundle of SiC fibers;

a pressure sintering step, in which a laminate of the prepreg sheets contained in a mold is sintered, while being pressurized, to obtain a pressure-sintered compact; and a decarburization step, in which the pressure-sintered compact is heated to gasify and release the carbon powder contained in the pressure-sintered compact.

The SiC ceramic structure according to the present invention can also be produced by a method including:

a slurry preparation step, in which a slurry is prepared by mixing SiC powder and carbon powder in a liquid;

a slurry sheet preparation step, in which a slurry sheet is prepared from the slurry;

a pressure sintering step, in which a laminate of a bundle of SiC fibers and the slurry sheet contained in a mold is sintered, while being pressurized, to obtain a pressure-sintered compact; and a decarburization step, in which the pressure-sintered compact is heated to gasify and release the carbon powder contained in the pressure-sintered compact.

In the previously described method, if a sheet made of a bundle of SiC fibers and the slurry sheet is laminated in a flat form, a laminated SiC ceramic structure including a fiber-reinforced portion (made of a bundle of SiC fibers soaked with the slurry) and a non-fiber-reinforced portion (made of the slurry sheet only) is obtained. This lamination may be made like a stack of plates or shaped into a cylindrical or spiral form. These shapes can be combined to produce SiC ceramic structures with various shapes, including the fiber-reinforced and non-fiber-reinforced portions.

Furthermore, the internal structure (e.g. the ratio between the fiber-reinforced portion and the non-fiber-reinforced portion, and/or their thicknesses) of the SiC ceramic structure can be changed by varying the thicknesses and/or the number of sheets to be laminated.

The SiC ceramic structure according to the present invention can be produced by using a reaction sintering method as well as the previously described liquid-phase sintering method (hot-pressing method).

In the case of using the reaction sintering, the method for producing a SiC ceramic structure according to the present invention includes:

a reaction preparation making step, in which a reaction preparation containing a bundle of SiC fibers, a carbon component and Si powder is made;

a reaction sintering step, in which the reaction preparation is heated to a temperature equal to or higher than the melting point of silicon so as to cause a reaction of the carbon component and the Si powder to obtain a reaction-sintered compact; and a decarburization step, in which the reaction-sintered compact is heated to gasify and release a residual carbon component contained in the reaction-sintered compact.

One example of the carbon component is carbon powder. In this case, for example, the reaction preparation may be a prepreg sheet created by preparing a slurry by mixing carbon powder and Si powder in a liquid, and by infiltrating the slurry into a sheet made of a bundle of SiC fibers. Another example of the reaction preparation is a laminate created by preparing a slurry sheet made from the aforementioned slurry and laminating the slurry sheet and a sheet made of a bundle of SiC fibers.

A phenol resin or similar resin which carbonizes at a temperature equal to or lower than the melting point of silicon may also be used as the carbon component. In this case, when a reaction preparation containing the resin is heated together with Si powder, the resin carbonizes before the temperature reaches the melting point of silicon, i.e. 1414° C., and after the melting point of silicon is reached, the carbonized component of the resin reacts with molten silicon, forming SiC.

The amount of carbon component to be mixed in the bundle of SiC fibers in the reaction preparation making step must exceed the amount necessary for the carbon component to react with Si powder and form SiC in the reaction sintering step. The excessive portion of the carbon component (residual carbon component) will be gasified and released in the decarburization step, forming a porous SiC ceramic matrix.

The reaction preparation may contain SiC powder. The particles of SiC powder mixed in the reaction preparation serve as nuclei, around which the SiC resulting from the reaction grows, forming a porous SiC ceramic matrix. This improves the efficiency of forming the porous SiC ceramic matrix.

Similar to the case of the liquid-phase sintering method, when the reaction sintering method is used, a SiC ceramic structure in a rod shape, plate shape or another shape can be created by using a rod-shaped bundle of SiC fibers or a sheet made of a bundle of SiC fibers. The number of bundles of the SiC fibers used may be any number equal to or greater than one. By appropriately combining these structures, it is possible to produce SiC ceramic structures with various shapes.

The SiC ceramic structure according to the present invention can be produced by using a chemical vapor infiltration method.

In the case of using the chemical vapor infiltration, the method for producing a SiC ceramic structure according to the present invention includes:

a chemical-vapor-infiltrated object preparation step, in which a mixed infiltrated gas prepared by mixing a SiC precursor and a carbon precursor is infiltrated through a bundle of SiC fibers at a temperature at which both the SiC precursor and the carbon precursor are thermally decomposed, so as to produce a chemical-vapor-infiltrated object made of the bundle of SiC fibers on which SiC resulting from thermal decomposition of the SiC precursor and carbon resulting from thermal decomposition of the carbon precursor is deposited; and a decarburization step, in which the chemical-vapor-deposited object is heated to gasify and release the carbon contained in the chemical-vapor-deposited object.

As the SiC precursor, methyltrichlorosilane (MTS), ethyltrichlorosilane (ETS) or a mixture thereof can be used. As the carbon precursor, methane, ethane, propylene or a mixture thereof can be used.

In the previously described methods for producing a SiC ceramic structure, the porosity of the porous SiC ceramic matrix can be controlled by regulating the amount of carbon powder in the case of the liquid-phase sintering method, the amount of carbon component (residual carbon component) in the case of the reaction sintering method, or the amount of the carbon precursor gas in the case of the chemical vapor infiltration method.

In the case of the liquid-phase sintering method, the amount of carbon powder to be mixed in the slurry preparation step corresponds to the amount of carbon powder to be gasified and released from the pressure-sintered compact in the decarburization step. Therefore, the porosity of the porous SiC ceramic matrix can be changed by regulating the volume ratio of the carbon powder mixed in the slurry preparation step, to the SiC powder.

In the case of the reaction sintering method, the amount of carbon component remaining after the reaction between the carbon component and the molten silicon in the reaction sintering step corresponds to the amount of residual carbon component to be gasified and released from the pressure-sintered compact in the decarburization step. Therefore, the porosity of the porous SiC ceramic matrix can be changed by regulating the amount of carbon component used in the reaction preparation making step.

In the case of the chemical vapor infiltration method, the amount of carbon to be deposited on the bundle of SiC fibers in the chemical-vapor-infiltrated object preparation step corresponds to the amount of carbon to be gasified and released from the chemical-vapor-infiltrated object in the decarburization step. Therefore, the porosity of the porous SiC ceramic matrix can be changed by regulating the volume ratio of carbon resulting from the thermal decomposition of the carbon precursor contained in the mixed deposition gas used in the chemical-vapor-infiltrated object preparation step, to SiC resulting from the thermal decomposition of the SiC precursor.

Whichever of the aforementioned production methods is used, it is preferable to regulate the amount of carbon powder, carbon component or deposited carbon so that the porosity of the porous SiC ceramic matrix will be within a range from 15 to 80%. This is because, if the amount of carbon powder or the like is lower than the aforementioned lower limit, oxygen cannot easily penetrate into the pressure-sintered compact, reaction-sintered compact or chemical-vapor-deposited object ("pressure-sintered compact or the like") in the decarburization step, so that it is difficult to assuredly gasify and release the carbon powder or the like contained in the pressure-sintered compact or the like. Other reasons for recommending the range from 15 to 80% for the porosity of the porous SiC ceramic matrix have already been explained. It is further preferable to regulate the amount of carbon powder or carbon component so that the porosity of the porous SiC ceramic matrix will be within a range from 25 to 60%.

In any of the previously described production methods, a SiC continuous fiber fabric can be used as the bundle of SiC continuous fibers. The SiC ceramic structure produced by using a SiC continuous fiber fabric is resistant to a rupture because, even if it is slightly cracked in some direction, the crack will not easily propagate in that direction.

All the methods for producing a SiC ceramic structure according to the present invention are based on a common technical idea in that a porous SiC ceramic matrix containing a bundle of continuous SiC fabrics is created by preparing a shaped object (a sintered compact or chemical-vapor-infiltrated object) containing a bundle of SiC continuous fibers and a carbon component and performing a decarburization step for gasifying and releasing carbon from the shaped object.

EFFECT OF THE INVENTION

Due to the presence of the bundle of SiC continuous fibers in the porous SiC ceramic matrix, the SiC ceramic material according to the present invention has not only high strength but also a high degree of toughness. Accordingly, the SiC ceramic structure consisting of this SiC ceramic material will not easily crack by a shock or the like. If a slight, partial crack is formed, it will not lead to a sudden rupture of the entire structure since the SiC continuous fibers impede development of the crack.

BEST MODE FOR CARRYING OUT THE INVENTION

One embodiment of the SiC ceramic structure and its production method according to the present invention is hereinafter described.

Figure 1:
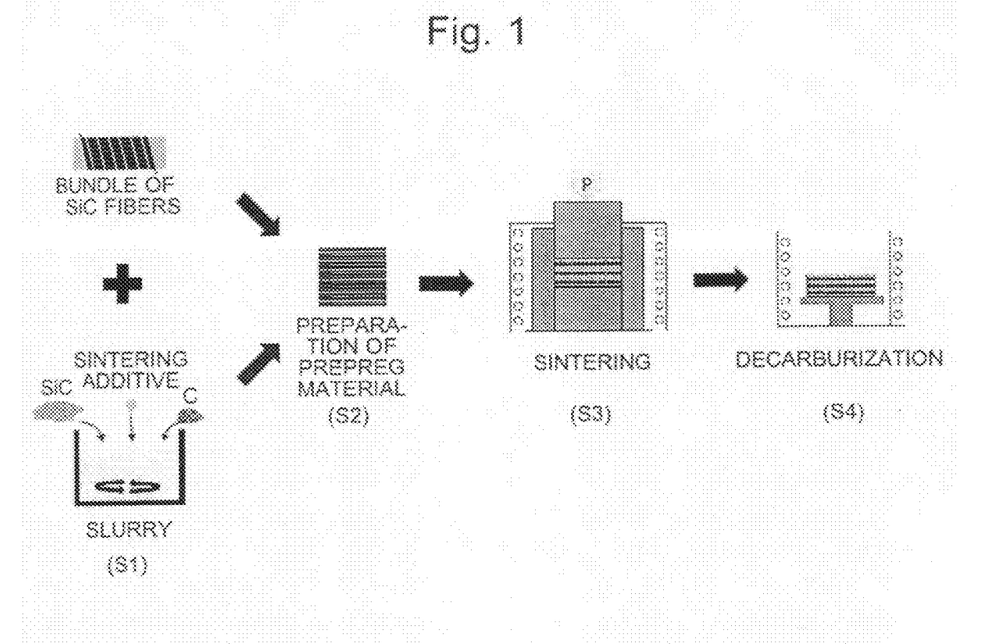
FIG. 1 is a schematic diagram showing one example of the process for producing the SiC ceramic structure according to the present invention, including (S1) a slurry preparation step, (S2) a prepreg material preparation step, (S3) a sintering step and (S4) a decarburization step.

FIG. 1 is a schematic diagram showing a process for producing a SiC ceramic structure by a liquid-phase sintering method (hot-press method). The process for producing the SiC ceramic structure according to the present embodiment consists of a slurry preparation step (Step S1), a prepreg material preparation step (Step S2), a pressure sintering step (Step S3) and a decarburization step (Step S4).

In the slurry preparation step (Step S1), a slurry is prepared by mixing SiC powder, carbon powder and a sintering additive in a liquid, such as water or alcohol. The use of the sintering additive is aimed at the promotion and stabilization of the sintering. Its amount is small and barely affects the qualities of the resulting SiC ceramic structure.

In the prepreg material preparation step (Step S2), a prepreg material is prepared by infiltrating the slurry into a bundle of SiC fibers. One example of the method for infiltrating the slurry into a bundle of SiC fibers is to apply the slurry on the bundle of SiC fibers. Another method is to immerse the bundle of SiC strand fibers in the slurry.

In the pressure sintering step (Step S3), the prepreg material is put in a molding die and press-molded at high temperature, whereby the prepreg material is sintered and a pressure-sintered compact is obtained. The temperature in this process is set to be higher than the eutectic point of SiC and the sintering additive and lower than the heatproof temperature of the SiC strand fibers. By this process, the SiC powder in the prepreg material is sintered. The sintering of the SiC particles and the SiC fibers also occurs.

In the decarburization step (Step S4), the pressure-sintered compact is heated under atmospheric air (under atmosphere in which oxygen is present). Due to the exposure of the pressure-sintered compact to atmospheric air at an elevated temperature, the carbon powder in the pressure-sintered compact reacts with oxygen, forming carbon dioxide, to be released in the form of gas. Depending on the temperature, the reaction of the carbon powder with oxygen can produce carbon dioxide and carbon monoxide, which are to be released in the form of gas. As a result, pores are formed at the locations from which carbon powder has been removed.

The portion in which the SiC powder contained in the prepreg material is sintered in the pressure sintering step, and in which a large number of micro pores have been formed as a result of the gasification and release of the carbon powder in the pressure-sintered compact in the decarburization step, corresponds to the porous SiC ceramic matrix of the SiC ceramic material according to the present invention. Thus, a SiC ceramic structure made of a SiC ceramic material composed of a porous SiC ceramic matrix containing a bundle of SiC fibers is obtained.

As the prepreg material, a laminate of prepreg sheets each of which consists of a bundle of SiC fibers soaked with the slurry can be used. By regulating the number of prepreg sheets to be laminated, a SiC ceramic structure having an appropriate thickness can be obtained.

It is also possible to directly put the bundle of SiC fibers and the slurry in the molding die, and to press-mold the SiC fibers and the slurry at a high temperature to sinter them and obtain a pressure-sintered compact. In this case, since the pressure-sintered compact is obtained without the step of infiltrating the slurry into the bundle of SiC fibers, the prepreg material preparation step is unnecessary.

The SiC ceramic structure may also be produced by preparing a slurry sheet from a slurry with a low liquid content, laminating the slurry sheet and a sheet made of a bundle of SiC fibers, pressure-sintering the laminate in a molding die, and decarburizing the sintered laminate. By this method, a laminated SiC ceramic structure including a fiber-reinforced portion (made of a bundle of SiC fibers soaked with the slurry) and a non-fiber-reinforced portion (made of the slurry sheet only) can be produced. In this case, the internal structure (e.g. the ratio between the fiber-reinforced portion and the non-fiber-reinforced portion, and/or their thicknesses) of the SiC ceramic structure can be changed by varying the thicknesses and/or the number of sheets to be laminated.

EXAMPLE

One specific example of the SiC ceramic structure and its production method according to the present invention will be hereinafter described in detail.

The SiC ceramic structure of the present example was produced as follows:

First, a slurry was prepared by mixing β-SiC powder (cubic crystalline powder of SiC), carbon powder, and aluminum oxide powder ($Al_2O_3$) and yttrium oxide ($Y_2O_3$) as the sintering additives in an alcohol-based solvent. In the present example, the β-SiC powder and the carbon powder were mixed at a volume ratio of 1:1.

Next, prepreg sheets were prepared by infiltrating the slurry into a sheet-shaped bundle of Tyranno-SA fiber, which is a type of high-crystallinity SiC fiber produced by Ube Industries, Ltd. The Tyranno-SA fiber used is a SiC fiber with a diameter of approximately 7 μm. In the present example, approximately 1600 Tyranno-SA fibers were bundled and shaped into a sheet, and the slurry was infiltrated into that sheet.

The prepreg sheets thus prepared were stacked in the form of a laminate in a graphite mold, and sintered at 1800° C. for one hour under argon atmosphere, being subjected to a uniaxial pressing of 10 MPa. In the last step, a thermal treatment was performed at 700° C. for five hours under atmospheric air to gasify and release the carbon powder in the pressure-sintered compact. Thus, a SiC ceramic structure made of a SiC ceramic material was obtained.

Figure 2:
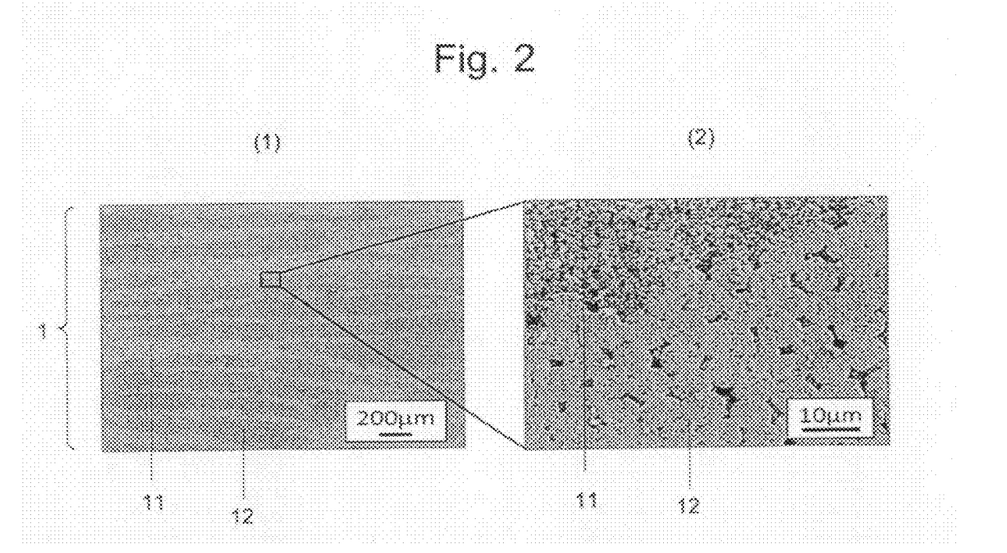
FIG. 2 shows (1) a scanning electron microscope image of a section of a SiC ceramic structure according to the present example, and (2) an enlarged photograph showing a portion of the scanning electron microscope image.

In FIG. 2, (1) is a scanning electron microscope image of a section of the SiC ceramic structure 1 obtained in the previously described example, and (2) is an enlarged view of a portion of (1). These images (1) and (2) of FIG. 2 show that the relatively dark-shaded areas are the portions made of a bundle of SiC fibers soaked with the slurry (which are hereinafter called the "fiber-reinforced portions 12"), while the light-shaded areas are the portions containing no SiC strand fibers (which are hereinafter called the "non-fiber-reinforced portions 11"). The non-fiber-reinforced portions 11 correspond to the bonding areas of the laminated prepreg sheets. Thus, it has been confirmed that the SiC ceramic structure 1 of the present example is a laminated SiC ceramic structure including the fiber-reinforced portions 12 and the non-fiber-reinforced portions 11.

Figure 3:
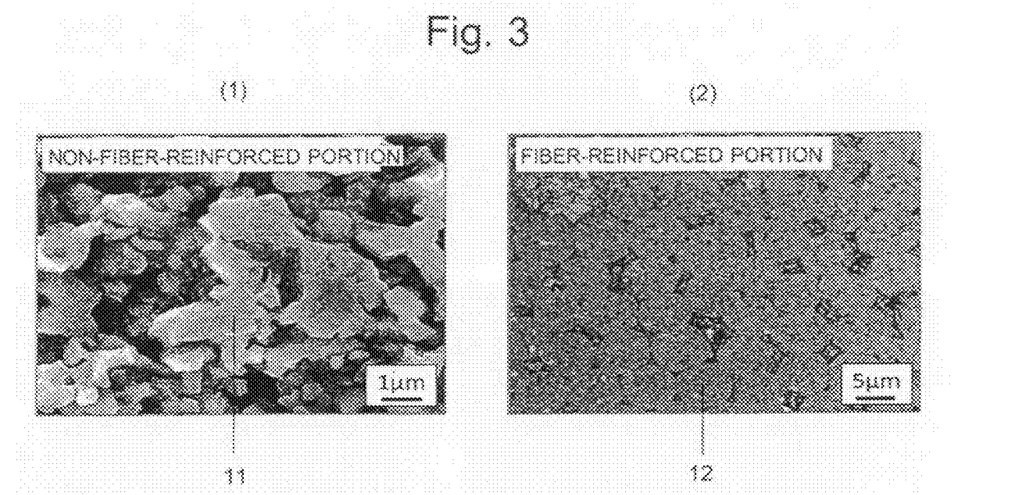
FIG. 3 shows (1) a scanning electron microscope image of the non-fiber-reinforced portion of the SiC ceramic structure according to the present example, and (2) a scanning electron microscope image of the fiber-reinforced portion of the same.

In FIG. 3, (1) and (2) are scanning electron microscope images of the non-fiber-reinforced portion 11 and the fiber-reinforced portion 12, respectively. By the image (2) in FIG. 2 as well as the images (1) and (2) in FIG. 3, it has been confirmed that the non-fiber-reinforced portion 11 have an infinite number of micro pores. In the fiber-reinforced portion 12, each SiC fiber retains a circular cross section, keeping much of its original shape. Thus, it has also been confirmed that the bonding of the SiC fibers is achieved by the sintering of the SiC powder and the SiC fibers, rather than by the mutual sintering of the SiC fibers.

The proportion of the SiC fibers (fiber volume content) in the SiC ceramic structure 1 obtained in the previous example was approximately 55% by volume. The porosity of the entire SiC ceramic structure 1 determined by the Archimedes method was approximately 30%, of which the open porosity was about 27% and the closed porosity was 3%. As can be seen in FIG. 3, the vast majority of the pores in the SiC ceramic structure 1 were formed in the non-fiber-reinforced portions 11. The porosity inside the non-fiber-reinforced portions 11, or inside the porous ceramic matrix, was approximately 50%. This corresponds to the fact that the β-SiC powder and the carbon powder was mixed at a volume ratio of 1:1. An open pore is a pore which is open to the outside. A closed pore is a pore which has no contact with the outside and is isolated inside.

Among the SiC powder, carbon powder and SiC fibers used as the materials, the weights of the SiC powder and the SiC strand fibers do not change through any of the process steps of producing the SiC ceramic structure 1. By contrast, the weight of the carbon powder decreases through the decarburization step, in which the carbon powder is converted to carbon dioxide or carbon monoxide by reaction under atmospheric air and released in the form of gas. Accordingly, the total weight of the aforementioned materials and that of the produced SiC ceramic structure 1 were compared; the result confirmed that the carbon powder had been entirely gasified and released through the decarburization step.

In the SiC ceramic structure 1 produced through the previously described process steps, the porosity of the porous SiC ceramic matrix correlated to the amount of carbon gasified and released in the decarburization step. The amount of carbon powder mixed in the slurry sheet preparation step correlated to the amount of carbon powder gasified and released from the pressure-sintered compact in the decarburization step.

If the porosity of the porous SiC ceramic matrix is lower than 15%, the thermal insulation properties of the product will be insufficient. On the other hand, if the porosity of the porous SiC ceramic matrix exceeds 80%, it is difficult to obtain adequate strength and toughness. If the amount of carbon powder is too small, oxygen cannot easily penetrate into the pressure-sintered or reaction-sintered compact ("pressure-sintered compact or the like") in the decarburization step, so that it is difficult to assuredly gasify and release the carbon powder or the like contained in the pressure-sintered compact or the like. Accordingly, it is preferable to mix the carbon powder by a volume ratio of 15 to 80% to the SiC powder in the slurry preparation step so that the porosity of the porous SiC ceramic matrix will be within a range from 15 to 80%. It is further preferable to set the volume ratio within a range from 25 to 60% so that the porosity of the porous SiC ceramic matrix will be within a range from 25 to 60%. Satisfying this condition allows the SiC ceramic material according to the present invention to be suitably used in the fields of nuclear energy, aerospace or other areas in which high thermal insulation properties, high thermal resistance and high toughness are particularly required.

The characteristics of the SiC ceramic structure 1 obtained in the previous example are hereinafter described.

[1] Three-Point Bending Test

A three-point bending test is a test in which a roughly rectangular parallelepiped specimen is fixed at two supporting points at both ends, and a load is applied to one middle point to determine the flexural strength, i.e. the stress that the specimen can bear during the bending test.

The flexural strength is expressed by the following equation:

Flexural Strength (MPa)=3 $PL/2\ Wh^2$ where P is the load, L is the distance between the supporting points (mm), W is the width of the specimen (mm), and h is the thickness of the specimen (mm).

In the test, the load was applied in the direction normal to the layer direction of the fiber-reinforced portions 12 in the specimen.

Figure 4:
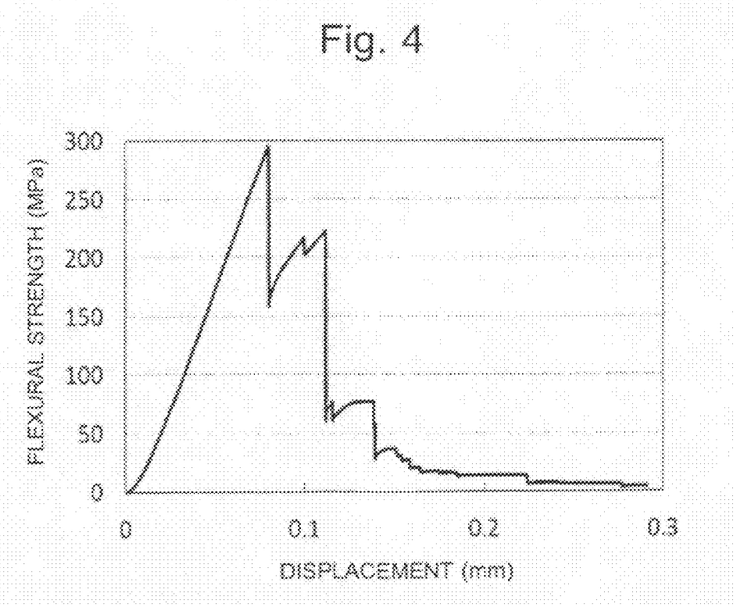
FIG. 4 is a graph showing a relationship between the flexural strength and the displacement in a three-point bending test of a specimen of the SiC ceramic structure according to the present example.

FIG. 4 is a graph showing the result of a three-point bending test using a specimen of the SiC ceramic structure 1 in the present example. In FIG. 4, the X-axis indicates the displacement (mm), i.e. the magnitude of flexure of the specimen during the bending test, and the Y-axis indicates the flexural strength (MPa). Despite its high porosity of approximately 30%, the specimen of the SiC ceramic structure 1 exhibited an extremely high flexural strength of up to 300 MPa. The graph shows that the flexural strength did not vertically fall toward the X-axis but decreased in a stepwise manner after reaching the highest point. This fact confirms that the specimen did not rupture suddenly but gradually. These test results prove that the specimen of the SiC ceramic structure 1 according to the present invention has a high degree of toughness.

Figure 5:
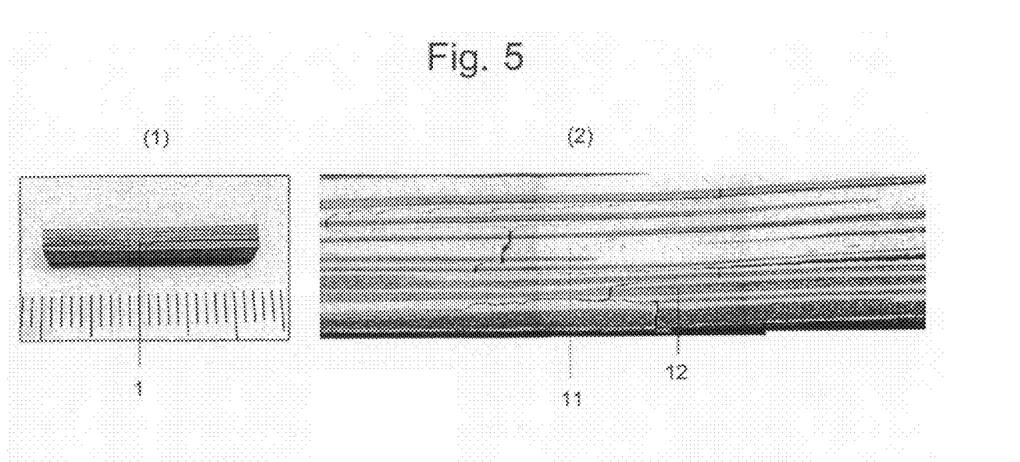
FIG. 5 shows (1) a photograph showing the entirety of the specimen of the SiC ceramic structure according to the present example after the three-point bending test, and (2) an enlarged photograph showing cracks in the specimen as viewed from one side.

Photograph (1) in FIG. 5 shows the entirety of the specimen of the SiC ceramic structure 1 after the three-point bending test. Even after the three-point test, the specimen kept much of its original shape, without being entirely ruptured. This fact also proves that the SiC ceramic structure 1 of the present example has a high degree of toughness.

Photograph (2) in FIG. 5 is an enlarged view of the specimen, showing the cracks formed in the specimen as viewed from one side. The crack formed in the surface of the specimen (at the bottom of the photograph) extends horizontally along the direction of the SiC fibers, making non-smooth progress in its entirety, rather than straightly running in the vertical direction. This result demonstrates that, in the SiC ceramic structure 1 of the present example, development of local cracks is impeded by the SiC fibers.

[2] Tensile Test

A tensile test is a test for evaluating the toughness and strength of the materials constituting a specimen. In this test, both ends of a roughly rectangular parallelepiped specimen are pinched with chucks and pulled in opposite directions to measure the tensile strain and the tensile stress until the specimen is ruptured.

The tensile strain is expressed by the following equation:

Tensile Strain (%)=$[(L1-L0)/L0]\times 100$ where L0 is the length of the specimen before the test, and L1 is the length of the specimen under load.

The tensile stress is expressed by the following equation:

Tensile Stress (MPa)=$F/A$ where F is the tensile-test load, and A is the cross-sectional area of the specimen before the test.

Figure 6:
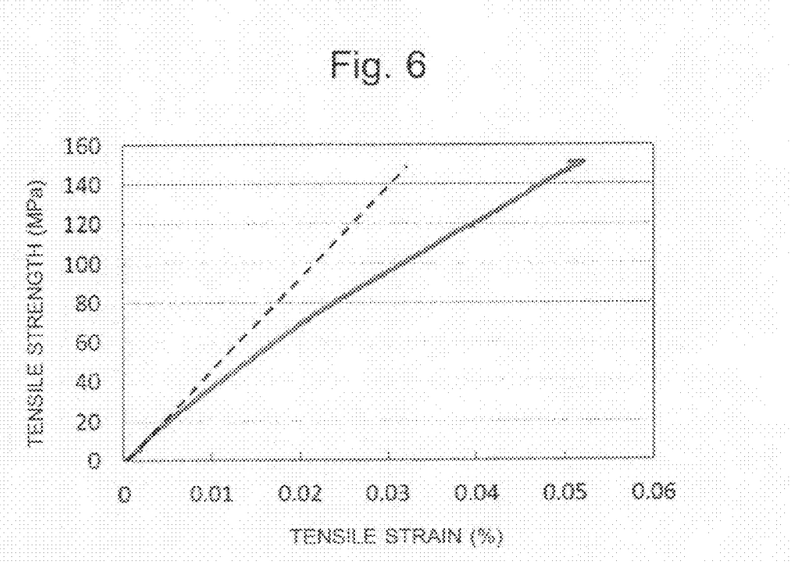
FIG. 6 is a graph showing the relationship between the tensile stress and the tensile strain in a tensile test of a SiC ceramic structure according to the present invention.

FIG. 6 is a graph showing the result of a tensile test in which a specimen of the SiC ceramic structure 1 was pulled along the same direction as the layer direction of the fiber-reinforced portion 12 of the SiC ceramic structure 1. In FIG. 6, the X-axis indicates the tensile strain (%), and the Y-axis indicates the tensile stress (MPa). The solid line in the graph shows the actual result of the test, while the broken line shows a theoretical relationship between the tensile stress and the tensile strain of an inductile material, based on the gradient at the point where the tensile strain is zero on the solid line showing the actual result of the test. For inductile materials, the tensile strain and the tensile stress are perfectly proportional to each other, as shown. By contrast, the specimen of the SiC ceramic structure 1 of the present example shows a greater increase in the tensile strain than the inductile material with increasing tensile stress. This result confirms that the structure in question is ductile.

Figure 7:
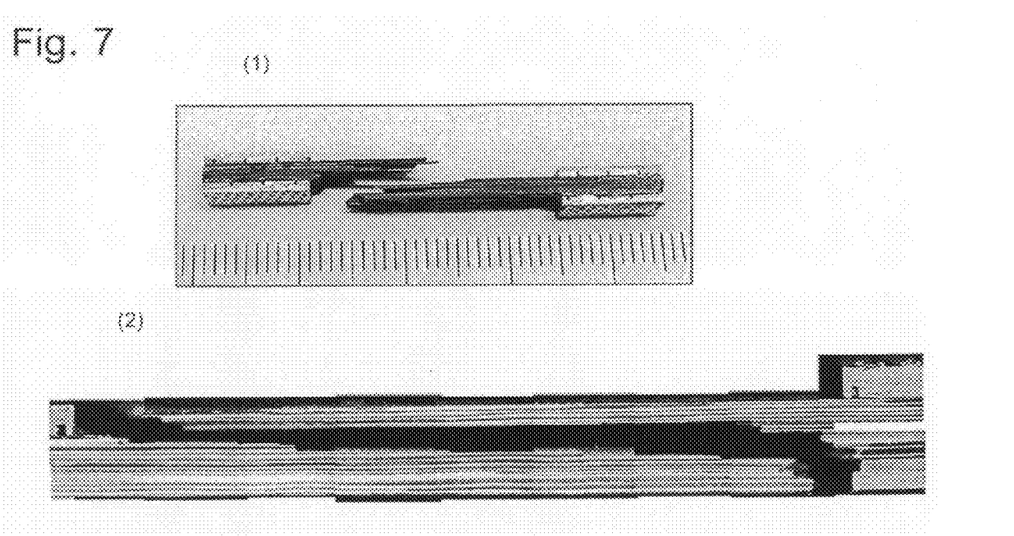
FIG. 7 shows (1) a photograph showing the entirety of the specimen of the SiC ceramic structure according to the present example after the tensile test, and (2) an enlarged photograph showing the ruptured portion in the specimen as viewed from one side.

Photograph (1) in FIG. 7 shows the entirety of the specimen of the SiC ceramic structure 1 after the tensile test. As can be seen, the specimen was cracked along the layer direction of the fiber-reinforced portions 12.

Photograph (2) in FIG. 7 shows a close-up of one side of the ruptured portion of the specimen. As can be seen in photograph (2) in FIG. 7, a shear fracture in the non-fiber-reinforced portion 11 and a pull-out of fibers in the fiber-reinforced portion 12 were observed in the specimen after the tensile test. This result confirms that the fiber-reinforced portion 12 has a higher level of strength than the non-fiber-reinforced portion 11. The fact that most of the cracks ran parallel to the tensile direction suggests that the frictional force which occurs inside the cracks may possibly contribute to the strength of the specimen.

As described thus far, the SiC ceramic structure 1 according to the present example is made of a SiC ceramic material which has not only a high level of strength but also a high degree of toughness. Therefore, the structure will not suddenly rupture if a slight crack is formed in it. In the case of conventional ceramic structures, a local crack will immediately lead to a rupture of the material. Therefore, their operating life is short, and they cannot be easily replaced with a new one before being entirely ruptured. By contrast, the SiC ceramic structure according to the present invention will not be ruptured all at once, because the development of the local crack is impeded by the SiC fibers. Therefore, it has a considerably longer operating life than conventional ceramic structures and needs to be replaced less frequently. By a periodic inspection or the like, an old part can be replaced with a new one before it is completely ruptured. These features allow the SiC ceramic structure according to the present embodiment to be suitably used, for example, as structural materials for the wall surfaces of a waste incineration power generation reactor or the nozzle of a chimney.

The SiC ceramic structure 1 according to the present example is entirely composed of SiC, including not only the non-fiber-reinforced portion 11 and the fiber-reinforced portion 12 but also the interfaces between them. Therefore, the interface layers do not easily deteriorate due to oxidative erosion even at high temperatures and under oxidative atmosphere, thus providing the SiC ceramic structure 1 according to the present example with an anti-corrosion characteristic suitable for structural materials.

It should be noted that the present invention is not limited to the previously described example. For example, the following modifications are possible.

In place of the β-SiC powder used as one of the materials in the previous example, a hexagonal or α-type SiC powder may be used. Furthermore, in place of the high-crystallinity SiC fiber used in the example, a SiC fiber with a lower degree of crystallinity may be used. As compared to high-crystallinity SiC fibers, low-crystallinity SiC fibers have lower heatproof temperatures (i.e. the temperature at which the fiber strength is maintained), and the pressure-sintering temperature must be set accordingly lower so that it will not exceed the low heatproof temperatures.

The SiC ceramic material according to the present invention can also be produced by the reaction sintering (RS) method.

When the reaction sintering method is used, the slurry preparation step (Step S1), the prepreg material preparation step (Step S2) and the pressure-sintering step (Step S3) in the previous example are replaced by a reaction preparation making step for making a reaction preparation containing a bundle of SiC fibers, a carbon component (e.g. carbon powder) and Si powder and a reaction sintering step for heating the reaction preparation to a temperature equal to or higher than the melting point of silicon so as to cause a reaction of the carbon component and the Si powder to obtain a reaction-sintered compact. The decarburization step is performed in the same manner as in the case of producing a SiC ceramic structure by the liquid-phase sintering method.

The amount of carbon component used in the reaction preparation making step must exceed the amount necessary for the carbon component to react with Si powder and form SiC in the reaction sintering step. The excessive portion of the carbon component (residual carbon component) is to be gasified and released in the decarburization step, forming a porous SiC ceramic matrix. Therefore, the porosity of the porous SiC ceramic matrix can be changed by regulating the amount of carbon component to be mixed in the reaction preparation making step. As already explained, the porosity should preferably be within a range from 15 to 80%, and more preferably from 25 to 60%.

The reaction preparation may contain SiC powder. When the SiC powder is mixed, the SiC particles serve as nuclei, around which the SiC resulting from the reaction grows, forming a porous SiC ceramic matrix. This improves the efficiency of creating the porous SiC ceramic matrix.

In the reaction preparation making step, a phenol resin or similar resin which carbonizes at a temperature equal to or lower than the melting point of silicon may also be used as the carbon component. In this case, when a reaction preparation containing the resin is heated together with Si powder, the resin carbonizes before the temperature reaches the melting point of silicon, i.e. 1414° C., and after the melting point of silicon is reached, the carbonized component of the resin reacts with molten silicon, forming SiC.

If the liquid-phase sintering method is used, the pressure-sintered compact is obtained at a high temperature and under high pressure (e.g. 1800° C., 10 MPa), so that it is difficult to use low-crystallinity SiC fibers, whose heatproof temperature is low.

By contrast, if the reaction sintering method is used, the reaction sinterin step is performed at temperatures around the melting point of silicon, i.e. 1414° C., without applying pressure, so that a low-crystallinity SiC fiber can be used. Thus, the reaction sintering method is advantageous in that a porous SiC ceramic material can be easily produced even if an inexpensive, low-crystallinity SiC fiber is used.

One example of the SiC ceramic structure produced by using the reaction sintering method is hereinafter described.

In this example, carbon powder was used as the carbon component, and a Tyranno-ZMI fiber (produced by Ube Industries, Ltd.), which is a type of SiC strand fiber whose crystallinity is lower than that of the Tyranno-SA fiber used in the previous example, was used. The amount of carbon powder to be used in the reaction preparation making step was regulated so that the volume ratio of the residual carbon component to SiC formed by the reaction of the carbon component and the molten silicon would be 20%. A reaction preparation was made by preparing a slurry sheet from a slurry containing carbon powder and Si powder and by sequentially laminating this slurry sheet and a sheet made of a bundle of Tyranno-ZMI fibers.

In the reaction sintering step, the reaction preparation was heated to 1450° C. to obtain a reaction-sintered compact. The decarburization step was performed in the same manner as in the previous example which used the liquid-phase sintering method.

Figure 8:
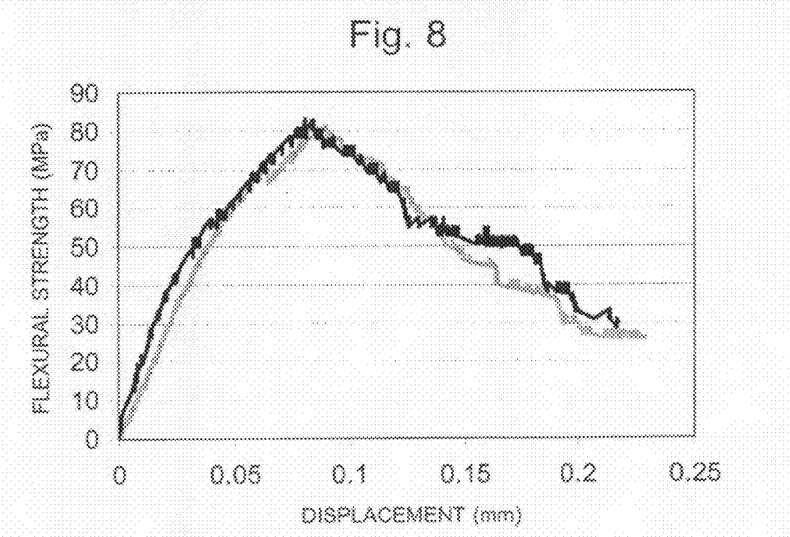
FIG. 8 is a graph showing a relationship between the flexural strength and the displacement in a three-point bending test of a specimen of a SiC ceramic structure produced by using a reaction sintering method.

FIG. 8 shows the result of a three-point bending test using two specimens cut out from the ceramic structure produced under the aforementioned conditions. The method of the three-point bending test was the same as used in the previous example. In FIG. 8, the horizontal axis is the displacement (mm) which indicates the magnitude of flexure of the specimen during the bending test, and the vertical axis is the flexural strength (MPa). In the present example, although low-crystallinity SiC fibers were used, both specimens produced by using the reaction sintering method exhibited high flexural strengths of approximately 80 MPa. Similar to the case of the SiC ceramic structure produced by using the pressure-sintering method, the flexural strength did not fall suddenly but decreased in a stepwise manner after reaching the highest point. This fact confirms that, also in the case of the SiC ceramic structure produced by using the reaction sintering method, the specimens did not rupture suddenly but gradually.

The SiC ceramic material according to the present invention can also be produced by the chemical vapor infiltration (CVI) method.

The chemical vapor infiltration method is a technique including the steps of passing a gaseous precursor through low-density fibers and thermally decomposing the precursor, with the resultant product deposited on the surfaces of the fibers.

A detailed procedure is as follows: A mixed deposition gas prepared by mixing a gaseous SiC precursor and a gaseous carbon precursor is passed through a bundle of SiC fibers at high temperature. As the gaseous SiC precursor, methyltrichlorosilane (MTS), ethyltrichlorosilane (ETS) or a mixture of these compounds can be used. As the gaseous carbon precursor, methane, ethane, propylene or a mixture of these compounds can be used. By passing the mixed deposition gas through the bundle of SiC fibers, a chemical-vapor-deposited object made of the bundle of SiC fibers on the surfaces of which SiC resulting from thermal decomposition of the SiC precursor and carbon resulting from thermal decomposition of the carbon precursor are deposited is produced. Then, under atmospheric air, the decarburization step for gasifying and releasing carbon by heating the chemical-vapor-deposited object to approximately 700° C. is performed.

Thus, a SiC ceramic structure made of a SiC ceramic material composed of a porous SiC ceramic matrix containing a bundle of SiC strand fibers is obtained.

In the case of producing a porous SiC ceramic material by the chemical vapor infiltration method, the porosity of the porous SiC ceramic matrix can be changed by regulating the amount of carbon in the chemical-vapor-deposited object by increasing or decreasing the amount of carbon precursor gas in the mixed deposition gas. As already explained, the porosity should preferably be within a range from 15 to 80%, and more preferably from 25 to 60%.

The methods for producing a SiC ceramic structure according to the present invention have the common feature that a porous SiC ceramic matrix containing a bundle of continuous SiC fabrics is created by preparing a shaped object (a sintered compact or chemical-vapor-infiltration object) containing a bundle of SiC fibers and a cabon component and performing a decarburization step for gasifying and releasing carbon from the shaped object.

The various processing conditions, the kinds of materials and other conditions of the present invention may appropriately be changed as long as they do not depart from the technical scope of the present invention.

For example, in any of the previously described production methods, a SiC ceramic structure in rod shape, plate shape or another shape can be created by using a rod-shaped bundle of SiC fibers or a sheet made of a bundle of SiC fibers. It is also possible to produce the SiC ceramic structure in various shapes by appropriately combining a plurality of bundles of SiC fibers. Furthermore, in any of the previously described production methods, a SiC fiber fabric can be used as the bundle of SiC fibers. The SiC ceramic structure produced by using a SiC fiber fabric is resistant to rupture because, even if it is slightly cracked in some direction, the crack will not easily develop in that direction.

INDUSTRIAL APPLICABILITY

The SiC ceramic material according to the present invention has a high level of strength and a high degree of toughness in addition to the high thermal insulation properties and lightness due to the porousness of the ceramic matrix. The "high thermal insulation properties" means that the material does not easily deteriorate under an environment in which high and low temperature conditions repeatedly occur as well as under an environment with a constant high-temperature condition. Furthermore, the SiC ceramic material according to the present invention does not easily deteriorate due to oxidative erosion even at high temperatures and under oxidative atmosphere, because it is made of SiC except for a trace amount of impurities and there is no other layer or part made of a different element. Accordingly, it can be suitably used as ultra-high temperature members for environmental energy industries, such as the wall surfaces of a waste incineration power generation reactor or the nozzle of a chimney. It may also be used in nuclear energy generation, e.g. for the cladding tubes in light-water reactors or the control rods in high-temperature gas reactors. Other possible applications include a nozzle for an ultra-high temperature engine, an ultra-high temperature turbine blade, and a ceramic heater in aerospace industry applications. Furthermore, the present material also has neutron resistance due to SiC and therefore can be used as an insert material of a dual-coolant lead lithium (DCLL) blanket for fusion reactors.

EXPLANATION OF NUMERALS

1 . . . SiC Ceramic Structure
11 . . . Non-fiber-reinforced Portion (Porous SiC Ceramic Matrix)
12 . . . Fiber-Reinforced Portion

The invention claimed is:

1. A method for producing a SiC ceramic structure, comprising:
   a slurry preparation step, in which a slurry is prepared by mixing SiC powder and carbon powder in a liquid;
   a pressure sintering step, in which a bundle of SiC continuous fibers and the slurry are put in a mold and sintered, while being pressurized, to obtain a pressure-sintered compact; and
   a decarburization step, in which the pressure-sintered compact is heated to gasify and release the carbon powder contained in the pressure-sintered compact,
   wherein a porosity of the SIC ceramic structure obtained by the decarburization step is within a range from 15 to 80%.

2. The method for producing a SiC ceramic structure according claim 1, wherein a volume ratio of the carbon powder mixed in the slurry preparation step, to the SiC powder is within a range from 15 to 80%.

3. The method for producing a SiC ceramic structure according to claim 1, wherein a SiC continuous fiber fabric is used as the bundle of SiC strand fibers.

4. The method for producing a SiC ceramic structure according to claim 1, wherein a porosity of the porous SiC ceramic structure obtained by the decarburization step is within a range from 25 to 60%.

5. A method for producing a SiC ceramic structure, comprising:
   a slurry preparation step, in which a slurry is prepared by mixing SiC powder and carbon powder in a liquid;
   a prepreg sheet preparation step, in which a prepreg sheet is prepared by infiltrating the slurry into a sheet made of a bundle of SiC strand fibers;
   a pressure sintering step, in which a laminate of the prepreg sheets contained in a mold is sintered, while being pressurized, to obtain a pressure-sintered compact; and
   a decarburization step, in which the pressure-sintered compact is heated to gasify and release the carbon powder contained in the pressure-sintered compact,
   wherein a porosity of the SIC ceramic structure obtained by the decarburization step is within a range from 15 to 80%.

6. The method for producing a SiC ceramic structure according to claim 5, wherein a volume ratio of the carbon powder mixed in the slurry preparation step, to the SiC powder is within a range from 15 to 80%.

7. The method for producing a SiC ceramic structure according to claim 5, wherein a Sic continuous fiber fabric is used as the bundle of SiC strand fibers.

8. A method for producing a SiC ceramic structure, comprising:
   a slurry preparation step, in which a slurry is prepared by mixing SiC powder and carbon powder in a liquid;

a slurry sheet preparation step, in which a slurry sheet is prepared from the slurry;

a pressure sintering step, in which a laminate of a bundle of SiC continuous fibers and the slurry sheet contained in a mold is sintered, while being pressurized, to obtain a pressure-sintered compact; and a decarburization step, in which the pressure-sintered compact is heated to gasify and release the carbon powder contained in the pressure-sintered compact, wherein a porosity of the SIC ceramic structure obtained by the decarburization step is within a range from 15 to 80%.

9. The method for producing a SiC ceramic structure according to claim 8, wherein a volume ratio of the carbon powder mixed in the slurry preparation step, to the SiC powder is within a range from 15 to 80%.

10. The method for producing a SiC ceramic structure according to claim 8, wherein a SiC continuous fiber fabric is used as the bundle of SiC strand fibers.

11. A method for producing a SiC ceramic structure, comprising:

a reaction preparation making step, in which a reaction preparation containing a bundle of SiC continuous fibers, a carbon component and Si powder is made;

a reaction sintering step, in which the reaction preparation is heated to a temperature equal to or higher than a melting point of silicon so as to cause a reaction of the carbon component and the Si powder to obtain a reaction-sintered compact; and a decarburization step, in which the reaction-sintered compact is heated to gasify and release a residual carbon component contained in the reaction-sintered compact, wherein a porosity of the SIC ceramic structure obtained by the decarburization step is within a range from 15 to 80%.

12. The method for producing a SiC ceramic structure according to claim 11, wherein, in the reaction preparation making step, the carbon component is mixed so that a volume ratio of SiC formed by a reaction of the carbon component and molten silicon to the residual carbon component is within a range from 15 to 80%.

13. The method for producing a SiC ceramic structure according to claim 11, wherein a SiC continuous fiber fabric is used as the bundle of SiC strand fibers.

14. A method for producing a SiC ceramic structure, comprising:

a chemical-vapor-infiltrated object preparation step, in which a mixed infiltration gas prepared by mixing a SiC precursor and a carbon precursor is infiltrated through a bundle of SiC continuous fibers at a temperature at which both the SiC precursor and the carbon precursor are thermally decomposed, so as to produce a chemical-vapor-infiltrated object made of the bundle of SiC continuous fibers on which SiC resulting from thermal decomposition of the SiC precursor and carbon resulting from thermal decomposition of the carbon precursor is deposited; and a decarburization step, in which the chemical-vapor-infiltrated object is heated to gasify and release the carbon contained in the chemical-vapor-deposited object, wherein a porosity of the SIC ceramic structure obtained by the decarburization step is within a range from 15 to 80%.

15. The method for producing a SiC ceramic structure according to claim 14, wherein, a ratio between the SiC precursor and the carbon precursor contained in the mixed deposition gas is regulated so that a volume ratio of carbon resulting from the decomposition of the carbon precursor to SiC resulting from the decomposition of the SiC precursor in the chemical-vapor-infiltrated object preparation step is within a range from 15 to 80%.

16. The method for producing a SiC ceramic structure according to claim 14, wherein a SiC continuous fiber fabric is used as the bundle of SiC strand fibers.

* * * * *